US010309329B2

(12) United States Patent
Tsunoda et al.

(10) Patent No.: US 10,309,329 B2
(45) Date of Patent: Jun. 4, 2019

(54) HYBRID VEHICLE WITH EXHAUST FILTER AND ECU PERMITTING FUEL CUT

(71) Applicant: TOYOTA JIDOSHA KABUSHIKI KAISHA, Toyota-shi, Aichi-ken (JP)

(72) Inventors: Asuka Tsunoda, Toyota (JP); Takashi Suzuki, Miyoshi (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/783,617

(22) Filed: Oct. 13, 2017

(65) Prior Publication Data

US 2018/0106206 A1 Apr. 19, 2018

(30) Foreign Application Priority Data

Oct. 19, 2016 (JP) ................................. 2016-204932

(51) Int. Cl.
*F01N 3/00* (2006.01)
*F02D 41/02* (2006.01)
(Continued)

(52) U.S. Cl.
CPC ............ *F02D 41/029* (2013.01); *B60K 6/445* (2013.01); *B60W 10/04* (2013.01); *B60W 10/06* (2013.01); *B60W 10/08* (2013.01); *B60W 10/26* (2013.01); *B60W 20/16* (2016.01); *F02D 41/123* (2013.01); *F02N 11/0829* (2013.01); *B60W 2510/068* (2013.01); *B60W 2510/244* (2013.01); *B60W 2530/12* (2013.01); *B60W 2710/0627* (2013.01); *B60W 2710/244* (2013.01); *B60Y 2300/476* (2013.01); *F02D 2200/0802* (2013.01); *F02D 2200/0812* (2013.01); *F02N 2200/061* (2013.01); *Y02T 10/48* (2013.01); *Y02T 10/54* (2013.01); *Y02T 10/6239* (2013.01); *Y02T 10/6286* (2013.01)

(58) Field of Classification Search
CPC .......... F01N 3/00; F01N 3/0232; F01N 3/023; F01N 3/0238
See application file for complete search history.

(56) References Cited

U.S. PATENT DOCUMENTS 7,207,171 B2 * 4/2007 Nagaoka ............... F02D 41/028
60/285
7,748,214 B2 * 7/2010 Ishii ........................ B60K 6/48
60/295
(Continued)

FOREIGN PATENT DOCUMENTS

JP 2002-303175 A 10/2002
JP 2006-275009 A 10/2006
(Continued)

*Primary Examiner* — James A Shriver, II
*Assistant Examiner* — James J Triggs
(74) *Attorney, Agent, or Firm* — Finnegan, Henderson, Farabow, Garrett & Dunner, LLP (57) ABSTRACT

In a hybrid vehicle including: an engine having an exhaust system in which a filter that removes particulate matter is provided; a motor configured to generate a driving force for the hybrid vehicle; a power storage device configured to exchange an electric power with the motor; and an electronic control unit configured to control the engine and the motor. When an accumulation amount of the particulate matter of the filter is equal to or more than a predetermined accumulation amount, the electronic control unit is configured to permit fuel cut of the engine when a temperature of the filter is lower than a predetermined temperature, and the electronic control unit is configured to prohibit the fuel cut of the engine when the temperature of the filter is equal to or higher than the predetermined temperature.

4 Claims, 5 Drawing Sheets

(51) Int. Cl.
    *B60W 20/16*     (2016.01)
    *B60K 6/445*     (2007.10)
    *B60W 10/04*     (2006.01)
    *B60W 10/26*     (2006.01)
    *F02N 11/08*     (2006.01)
    *B60W 10/06*     (2006.01)
    *B60W 10/08*     (2006.01)
    *F02D 41/12*     (2006.01)

(56) References Cited

U.S. PATENT DOCUMENTS

| | | | |
|---|---|---|---|
| 2009/0043437 A1* | 2/2009 | Shiino | B60W 20/15 701/22 |
| 2010/0205942 A1 | 8/2010 | Fujiwara et al. | |
| 2014/0013727 A1* | 1/2014 | Schneider | F01N 3/035 60/274 |
| 2016/0115887 A1* | 4/2016 | Tsunooka | F02D 41/0087 60/274 |
| 2016/0201534 A1* | 7/2016 | Lambert | F02D 41/029 60/274 |

FOREIGN PATENT DOCUMENTS

| | | |
|---|---|---|
| JP | 2009-074426 A | 4/2009 |
| JP | 2009-262076 A | 11/2009 |
| JP | 2015-031166 A | 2/2015 |
| JP | 2015-202832 | 11/2015 |
| WO | WO 2015/159218 A3 | 10/2015 |

* cited by examiner

HYBRID VEHICLE WITH EXHAUST FILTER AND ECU PERMITTING FUEL CUT

INCORPORATION BY REFERENCE

The disclosure of Japanese Patent Application No. 2016-204932 filed on Oct. 19, 2016 including the specification, drawings and abstract is incorporated herein by reference in its entirety.

BACKGROUND

1. Technical Field

The disclosure relates to a hybrid vehicle, and particularly to a hybrid vehicle including an engine having a filter that removes particulate matter in an exhaust system.

2. Description of Related Art

The related art, a hybrid vehicle which includes an engine in which a filter that removes particulate matter is attached to an exhaust passage or a generator, a motor, and battery, expands a control range of the state of charge (SOC) of the battery when regeneration of the filter is needed, decreases the SOC of the battery below the lower limit of the control range before the expansion and then increases the SOC above the upper limit of the control range before the expansion, and then stops the injection of the fuel into the engine to regenerate the filter is proposed (for example, refer to Japanese Unexamined Patent Application Publication No. 2015-202832). Regeneration of the filter is performed, when the temperature of the filter is within a regenerable temperature range suitable for regeneration, by stopping the injection of the fuel into the engine and supplying air containing oxygen to the filter to burn the particulate matter. In the hybrid vehicle described above, when regeneration of the filter is needed, the control range of the SOC is expanded to reduce the SOC of the battery. Therefore, compared to a case where the SOC of the battery is not reduced, the subsequent operation time of the engine is prolonged to ensure the operation time of the engine needed to increase the temperature of the filter to the regenerable temperature range and rapidly regenerate the filter.

SUMMARY

In the hybrid vehicle described above, when the injection of the fuel into the engine is stopped in response to a request for regeneration of the filter, there may be cases where the temperature of the filter increases due to the combustion of the particulate matter accumulated on the filter and the filter is overheated.

The disclosure provides a hybrid vehicle which prevents a filter that is attached to the exhaust system of an engine and removes particulate, matter from being overheated.

An aspect relates to a hybrid vehicle including: an engine having an exhaust system in which a filter that removes particulate matter is provided; a motor configured to generate a driving force for the hybrid vehicle; a power storage device configured to exchange an electric power with the motor; and an electronic control unit configured to control the engine and the motor. When an accumulation amount of the particulate matter of the filter is equal to or more than a predetermined accumulation amount, the electronic control unit is configured to permit fuel cut of the engine when a temperature of the filter is equal to or lower than a predetermined temperature, and the electronic control unit is configured to prohibit the fuel cut of the engine when the temperature of the filter is higher than the predetermined temperature.

With the hybrid vehicle according to the aspect, when the accumulation amount of the particulate matter of the filter which is provided in the exhaust system of the engine and which removes the particulate matter is equal to or higher than the predetermined accumulation amount, when the temperature of the filter is lower than the predetermined temperature, the fuel cut of the engine is permitted, and when the temperature of the filter is equal to or higher than the predetermined temperature, the fuel cut of the engine is prohibited. Here, the "predetermined accumulation amount" is an accumulation amount by which it can be determined that regeneration of the filter is needed. The "predetermined temperature" is higher than a regenerable temperature filter and is a temperature by which it can be determined that there is a possibility that the filter may be overheated when the fuel cut of the engine is performed. In the hybrid vehicle, when the temperature of the filter is lower than the predetermined temperature, by performing the fuel cut in response to the permission of the fuel cut of the engine, air (oxygen) is supplied to the filter to burn the particulate matter accumulated on the filter, thereby regenerating the filter. On the other hand, when the temperature of the filter is equal to or higher than the predetermined temperature, by prohibiting the fuel cut of the engine and continuing the operation (the injection of the fuel) of the engine, an increase in the temperature of the filter due to the combustion of the particulate matter can be suppressed, and the filter can be prevented from being overheated. In general, when the temperature of the filter is lower than the regenerable temperature, the engine is operated under a relatively high load to increase the temperature of the filter to the regenerable temperature or higher. When the engine is operated under a relatively high load, fuel injection control of the engine may be performed so that an air-fuel ratio is repeated between rich and lean (so-called dither control may be performed).

The hybrid vehicle according to the aspect may further include a generator configured to generate an electric power by using power from the engine and exchange the electric power with the power storage device. When the accumulation amount of the particulate matter of the filter is equal to or more than the predetermined accumulation amount and the temperature of the filter is equal to or higher than the predetermined temperature, the electronic control unit is configured to cause the engine to be subjected to a load operation or no-load operation when a state of charge of the power storage device is lower than a predetermined state of charge, and the electronic control unit is configured to cause the engine to be subjected to the no-load operation when the state of charge of the power storage device is equal to or higher than the predetermined state of charge. Therefore, when the state of charge of the power storage device is equal to or higher than the predetermined state of charge, the engine is not subjected to the load operation, thereby preventing the power storage device from being charged. Accordingly, the power storage device can be prevented from being overcharged.

In the hybrid vehicle according to the aspect, the predetermined temperature may be set to be lower when the accumulation amount of the particulate matter of the filter is large than when the accumulation amount of the particulate matter of the filter is small. This is because the inventors have found through experiments and analysis that the filter is likely to be overheated (any abnormality is likely to occur) as the accumulation amount of the particulate matter accumulated on the filter increases even when the temperature of the filter is low.

In the hybrid vehicle according to the aspect, the filter may the filter includes a base material which removes the particulate matter and a catalyst which cleans exhaust gas, the catalyst being formed integrally with the base material. In this case, the filter can be prevented from being overheated by the above-described control, and thus the base material and the catalyst can be further protected.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Embodiments will be described with reference to examples.

Figure 1:
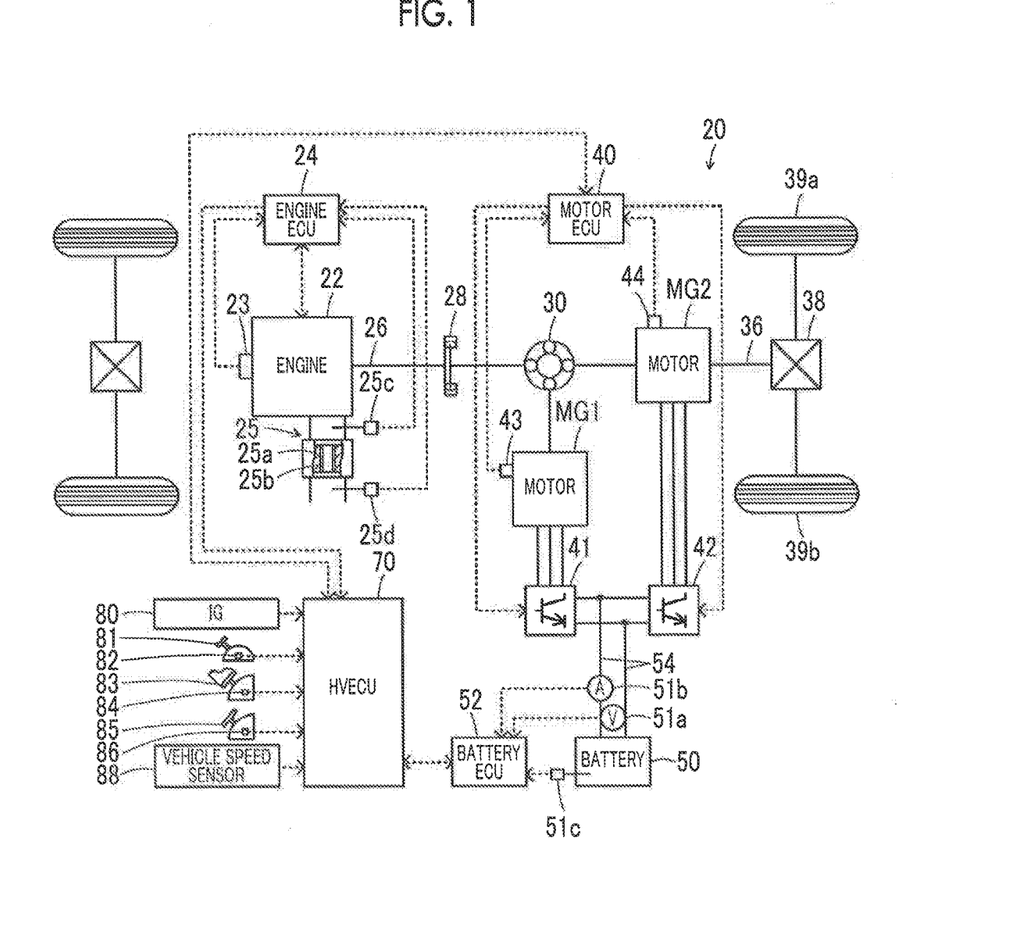
FIG. 1 is a configuration diagram schematically illustrating the configuration of a hybrid vehicle as an example.

FIG. 1 is a configuration diagram schematically illustrating the configuration of a hybrid vehicle 20 as an example. As illustrated in the figure, the hybrid vehicle 20 of the example includes an engine 22, a planetary gear 30, motors MG1, MG2, inverters 41, 42, a battery 50 as a power storage device, and a hybrid electronic control unit (hereinafter, referred to as "HVECU") 70.

The engine 22 is configured as an internal combustion engine that outputs power using gasoline, diesel fuel, or the like as a fuel. A particulate matter removing filter (hereinafter, referred to as "PM filter") 25 is attached to the exhaust system of the engine 22. The PM filter 25 is integrally formed by attaching (applying) a catalyst 25b having a noble metal to a porous base material 25a formed of ceramic, stainless steel, or the like, and removes particulate matter (PM) such as soot in the exhaust gas as well as unburned fuel and nitrogen oxides. The operation of the engine 22 is controlled by an engine electronic control unit (hereinafter, referred to as "engine ECU") 24.

Although not illustrated in the figure, the engine ECU 24 is configured as a microprocessor mainly including a CPU, and includes, in addition to the CPU, a ROM that stores processing programs, a RAM that temporarily stores data, input/output ports, and communication ports. Signals from various sensors needed for controlling the operation of the engine 22 are input to the engine ECU 24 via the input ports. Examples of the signals input to the engine ECU 24 include a crank angle θcr from a crank position sensor 23 that detects the rotational position of a crankshaft 26 and a coolant temperature Tw from a coolant temperature sensor (not illustrated) that detects the temperature of the coolant of the engine 22. In addition, examples thereof also include a throttle valve opening degree TH from a throttle valve position sensor (not illustrated) that detects the position of a throttle valve, an intake air amount Qa from an air flow meter (not illustrated) attached to an intake pipe, and an intake air temperature Ta from a temperature sensor (not illustrated) attached to the intake pipe. Furthermore, examples thereof also include pressures P1, P2 from pressure sensors 25c, 25d attached to the upstream side and the downstream side of the PM filter 25 of the exhaust system. Various control signals for controlling the operation of the engine 22 are output from the engine ECU 24 via the output ports. Examples of signals output from the engine ECU 24 include a drive control signal for a throttle motor that adjusts the position of the throttle valve, a drive control signal for a fuel injection valve, and a drive control signal for an ignition coil integrated with an igniter. The engine ECU 24 is connected to the HVECU 70 via the communication port. The engine ECU 24 calculates a rotational speed Ne of the engine 22 based on the crank angle θcr from the crank position sensor 23. In addition, the engine ECU 24 also calculates, based on the intake air amount Qa from the air flow meter and the rotational speed Ne of the engine 22, a volumetric efficiency (the ratio of the volume of the air actually drawn in one cycle to the stroke volume per cycle of the engine 22) KL. Furthermore, the engine ECU 24 calculates (estimates) a PM accumulation amount Qpm as the accumulation amount of the particulate matter accumulated on the PM filter 25 based on the pressure difference ΔP (ΔP=P1−P2) between the pressures P1, P2 from the pressure sensors 25c, 25d, or calculates (estimates) a filter temperature Tf as the temperature of the PM filter 25 based on the operation state (the rotational speed Ne and volumetric efficiency KL) of the engine 22.

The planetary gear 30 is configured as a single-pinion planetary gear mechanism. The rotor of the motor MG1 is connected to the sun gear of the planetary gear 30. A driving shaft 36 connected to driving wheels 39a, 39b via a differential gear 38 is connected to the ring gear of the planetary gear 30. The crankshaft 26 of the engine 22 is connected to the carrier of the planetary gear 30 via a damper 28.

For example, the motor MG 1 is configured as a synchronous generator motor, and as described above, the rotor thereof is connected to the sun gear of the planetary gear 30. For example, the motor MG2 is configured as the synchronous generator motor, and the rotor thereof is connected to the driving shaft 36. The inverters 41, 42 are connected to the motors MG1, MG2 and are also connected to the battery 50 via power lines 54. The motors MG1, MG2 are rotatably driven by switching control of a plurality of switching elements (not illustrated) of the inverters 41, 42 by a motor electronic control unit (hereinafter, referred to as "motor ECU") 40.

Although not illustrated in the figure, the motor ECU 40 is configured as a microprocessor mainly including a CPU, and includes, in addition to the CPU, a ROM that stores processing programs, a RAM that temporarily stores data, input/output ports, and communication ports. Signals from various sensors needed for controlling the driving of the motors MG1, MG2 are input to the motor ECU 40 via the input ports. Examples of signals to be input to the motor ECU 40 include rotational positions θm1, θm2 from rotational position detection sensors 43, 44 that detect the rotational positions of the rotors of the motors MG1, MG2, and phase currents from current sensors that detect the current flowing through each phase of the motors MG1, MG2. Switching control signals for the switching elements (not illustrated) of the inverters 41, 42 and the like are output from the motor ECU 40 via the output ports. The motor ECU 40 is connected to the HVECU 70 via the communication port. The motor ECU 40 calculates, based on the rotational positions θm1, θm2 of the rotors of the motors MG1, MG2 from rotational position detection sensors 43, 44, rotational speeds Nm1, Nm2 of the motors MG1, MG2.

For example, the battery 50 is configured as a lithium-ion secondary battery or a nickel-hydrogen secondary battery, and is connected to the inverters 41, 42 via the power lines 54. The battery 50 is managed by a battery electronic control unit (hereinafter referred to as "battery ECU") 52.

Although not illustrated in the figure, the battery ECU 52 is configured as a microprocessor mainly including a CPU, and includes, in addition to the CPU, a ROM that stores processing programs, a RAM that temporarily stores data, input/output ports, and communication ports. Signals from various sensors needed for managing the battery 50 are input to the battery ECU 52 via the input ports. Examples of signals to be input to the battery ECU 52 include a voltage Vb of the battery 50 from a voltage sensor 51a installed between the terminals of the battery 50, a current Ib of the battery 50 from a current sensor 51b attached to the output terminal of the battery 50, and a temperature Tb of the battery 50 from a temperature sensor 51c attached to the battery 50. The battery ECU 52 is connected to the HVECU 70 via the communication port. The battery ECU 52 calculates a stored power ratio SOC based on the integrated value of the current Ib of the battery 50 from the current sensor 51b or calculates input/output limits Win, Wout based on the calculated stored power ratio SOC and the temperature Tb of the battery 50 from the temperature sensor 51c. The stored power ratio SOC is the ratio of the capacity of the power from which the battery 50 can be discharged to the total capacity of the battery 50. The input and output limits Win, Wont are allowable charge/discharge powers at which the battery 50 may be charged or discharged.

Although not illustrated in the figure, the HVECU 70 is configured as a microprocessor mainly including a CPU, and includes, in addition to the CPU, a ROM that stores processing programs, a RAM that temporarily stores data, input/output ports, and communication ports. Signals from various sensors are input to the HVECU 70 via the input ports. Examples of signals to be input to the HVECU 70 include an ignition signal from an ignition switch 80 and a shift position SP from a shift position sensor 82 that detects the operation position of a shift lever 81. In addition, examples thereof may further include an accelerator operation amount Acc from an accelerator pedal position sensor 84 that detects the depression amount of an accelerator pedal 83, a brake pedal position BP from a brake pedal position sensor 86 that detects the depression amount of a brake pedal 85, and a vehicle speed V from a vehicle speed sensor 88. As described above, the HVECU 70 is connected to the engine ECU 24, the motor ECU 40, and the battery ECU 52 via the communication ports.

The hybrid vehicle 20 of the example configured as described above travels in a hybrid traveling mode (HV traveling mode) in which the hybrid vehicle 20 travels in accordance with the rotation (operation or a fuel cut during rotation) of the engine 22 or in an electric traveling mode (EV traveling mode) in which the hybrid vehicle 20 travels in accordance with the rotation stop (operation stop) of the engine 22.

In the HV traveling mode, basically, the following traveling control is performed by cooperative control among the HVECU 70, the engine ECU 24, and the motor ECU 40. The HVECU 70 sets a needed torque Td* which is needed for traveling (needed for the driving shaft 36) based on the accelerator operation amount Acc and the vehicle speed V, and calculates a needed power Pd* needed for traveling (needed for the driving shaft 36) by multiplying the set needed torque Td* by a rotational speed Nd (the rotational speed Nm2 of the motor MG2) of the driving shaft 36. The HVECU 70 calculates a needed power Pe* needed for the vehicle (needed for the engine 22) by subtracting a charge/discharge needed power Pb* (a value which is positive during discharging from the battery 50) based on the stored power ratio SOC of the battery 50 from the needed power Pd*. Subsequently, a target rotational speed Ne* and a target torque Te* of the engine 22 and torque commands Tm1* and Tm2* of the motors MG1, MG2 are set so that the needed power Pe* is output from the engine 22 and the needed torque Td* is output to the driving shaft 36 in the ranges of the input/output limits Win, Wout of the battery 50. In addition, the target rotational speed Ne* and the target torque Te* of the engine 22 are transmitted to the engine ECU 24, and the torque commands Tm1* and Tm2* of the motors MG1, MG2 are transmitted to the motor ECU 40. When the engine ECU 24 receives the target rotational speed Ne* and the target torque Te* of the engine 22, the engine ECU 24 performs intake air amount control, fuel injection control, ignition control, and the like for the engine 22 so as to operate the engine 22 based on the target rotational speed Ne* and the target torque Te*. The motor ECU 40 receives the torque commands Tm1* and Tm2* of the motors MG1, MG2, the motor ECU 40 performs the switching control of the switching elements of the inverters 41, 42 so as to drive the motors MG1, MG2 under the torque commands Tm1* and Tm2*.

In the EV traveling mode, basically, the following traveling control is performed by cooperative control among the HVECU 70, the engine ECU 24, and the motor ECU 40. The HVECU 70 sets the needed torque Td* based on the accelerator operation amount Acc and the vehicle speed V, sets the torque command Tm1* of the motor MG1 to a value of zero, sets the torque command Tm2* of the motor MG2 so as to output the needed torque Td* to the driving shaft 36 in the ranges of the input/output limits Win, Woutput of the battery 50, and transmits the torque commands Tm1* and Tm2* of the motors MG1, MG2 to the motor ECU 40. Control of the inverters 41, 42 by the motor ECU 40 is described above.

Figure 2:
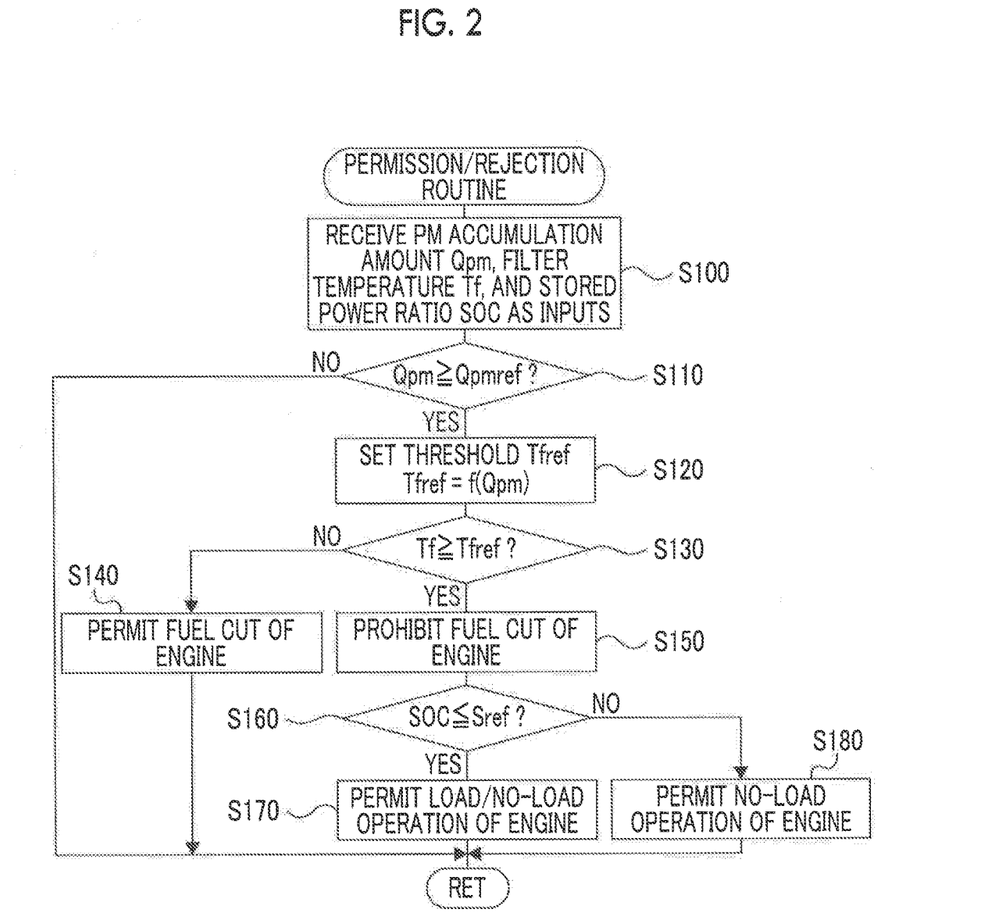
FIG. 2 is a flowchart showing an example of a permission/rejection routine executed by an HVECU of the example.

Next, the operation of the hybrid vehicle 20 of the example configured as described above, and particularly, the operation when regeneration of the PM filter 25 is needed will be described. FIG. 2 is a flowchart showing an example of a permission/rejection routine executed by the HVECU 70 of the example. The routine is repeatedly executed during the HV traveling mode.

When the permission/rejection routine is executed, the HVECU 70 receives, as inputs, data such as the PM accumulation amount Qpm as the accumulation amount of the particulate matter accumulated on the PM filter 25, the filter temperature Tf as the temperature of the PM filter 25, and the stored power ratio SOC of the battery 50 (step S100). Here, the PM accumulation amount Qpm is calculated (estimated) based on the pressure difference ΔP (ΔP=P1−P2) between the pressures P1, P2 from the pressure sensors 25c, 25d and is input through communication from the engine ECU 24. The filter temperature Tf is calculated (estimated) based on the operation state of the engine 22 and is input through communication from the engine ECU 24. The stored power ratio SOC of the battery 50 is calculated based on the integrated value of the current Ib of the battery 50 from the current sensor 51b and is input through communication from the battery ECU 52.

When the data is input in this manner, a determination is made whether or not the input PM accumulation amount Qpm is equal to or more than a threshold Qpmref (step S110). Here, the threshold Qpmref is the PM accumulation amount Qpm by which it can be determined that regeneration of the PM filter 25 is needed. When the PM accumulation amount Qpm is less than the threshold Qpmref, a determination is made that regeneration of the PM filter 25 is not needed, and the routine is ended.

When the PM accumulation amount Qpm is equal to or more than the threshold Qpmref in step S110, a determination is made that regeneration of the PM filter 25 is needed, a threshold Tfref is set based on the PM accumulation amount Qpm (step S120), and a determination is made that the filter temperature Tf is equal to or more than the threshold Tfref (step S130). Here, the threshold Tfref is a temperature lower than an overheat temperature Tfot, and a method of setting the threshold Tfref will be described later. The overheat temperature Tfot is the filter temperature Tf by which it can be determined that the PM filter 25 is overheated and is defined as a temperature at which there is a possibility of any abnormality (for example, damage to the base material 25a or the catalyst 25b) in the PM filter 25 or a temperature slightly lower than the temperature. When the filter temperature Tf is lower than the threshold Tfref in step S130, fuel cut of the engine 22 for regenerating the PM filter 25 is permitted (step S140), and the routine is ended. In this case, when the filter temperature Tf is lower than a regenerable temperature Tfreg, the engine 22 is operated under a relatively high load to increase the filter temperature Tf to the regenerable temperature Tfreg or higher. When the filter temperature Tf is equal to or higher than the regenerable temperature Tfreg, the fuel injection to the engine 22 is stopped (fuel cut is performed), air (oxygen) is supplied to the PM filter 25, and the particulate matter accumulated on the PM filter 25 is burned, thereby regenerating the PM filter 25. In addition, when the engine 22 is operated under a relatively high load, fuel injection control of the engine 22 may be performed so that an air-fuel ratio is repeated between rich and lean (so-called dither control may be performed). In addition, when fuel cut of the engine 22 is performed, the engine 22 may be motorized by the motor MG 1.

Figure 3:
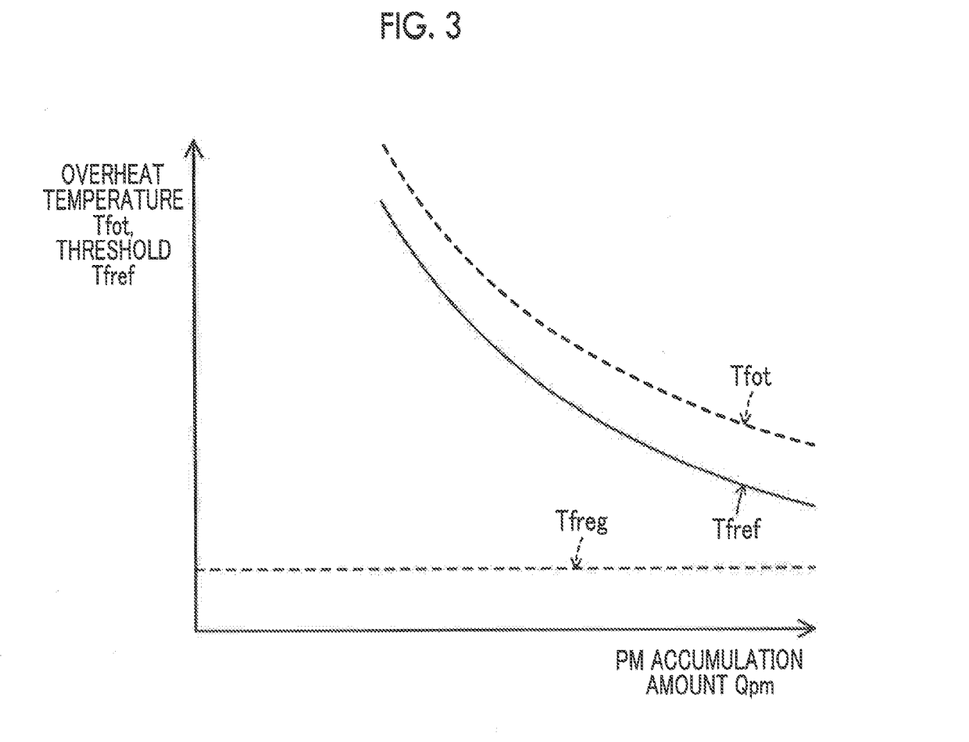
FIG. 3 is an explanatory view showing an example of a threshold setting map.

Here, the threshold Tfref will be described. The threshold Tfref is a temperature at which there is a possibility that when air (oxygen) is supplied to the PM filter 25 by performing fuel cut of the engine 22, the filter temperature Tf may increase to the overheat temperature Tfot or higher due to the combustion of particulate matter. In the example, regarding the threshold Tfref, the relationship between the PM accumulation amount Qpm and the threshold. Tfref is determined in advance and stored in a ROM (not illustrated) as a threshold setting map, and when the PM accumulation amount Qpm is given, the corresponding threshold Tfref is derived from the map and set. An example of the threshold setting map is shown in FIG. 3. In FIG. 3, the overheat temperature Tfot and the regenerable temperature Tfreg are also shown for reference. As shown in the figure, the threshold Tfref is set to be lower when the PM accumulation amount Qpm is large than when the PM accumulation amount Qpm is small within a range which is lower than the overheat temperature Tfot and higher than the regenerable temperature Tfreg like the overheat temperature Tfot. More specifically, a total overheat constant temperature Tfhi is set to decrease as the PM accumulation amount Qpm increases. This is because the inventors have found through experiments and analysis that any abnormality is likely to occur in the PM filter 25 as the PM accumulation amount. Qpm increases even when the filter temperature Tf is low.

When the filter temperature Tf is equal to or higher than the threshold Tfref in step S130, fuel cut of the engine 22 is prohibited (step S150). Then, the stored power ratio SOC of the battery 50 is compared with a threshold Sref (step S160). Here, the threshold Sref is determined, for example, depending on the upper limit of a typical control range of the battery 50, and for example, 65%, 70%, 75%, or the like can be used.

When the stored power ratio SOC of the battery 50 is equal to or lower than the threshold Sref, a load operation and a no-load operation (idle operation) of the engine 22 are permitted (step S170), and the routine is ended. In this case, the engine 22 is subjected to the load operation or no-load operation according to the needed power Pe* (fuel cut of the engine 22 is not performed even though the needed power Pe* is small).

When the stored power ratio SOC of the battery 50 is higher than the threshold Sref, solely the no-load operation of the engine 22 is permitted (step S180), and the routine is ended. In this case, the engine 22 is subjected to the no-load operation regardless of the needed power Pe* (fuel cut of the engine 22 is not performed). Accordingly, compared to the load operation of the engine 22, an increase in the stored power ratio SOC of the battery 50 can be suppressed, and the battery 50 can be prevented from being overcharged.

As described above, when the filter temperature Tf is equal to or higher than the threshold Tfref, fuel cut of the engine 22 is prohibited and the engine 22 is subjected to the load operation or the no-load operation. Therefore, incidents such as an increase in the filter temperature Tf to the overheat temperature Tfot or higher due to the fuel cut of the engine 22 can be further suppressed. Accordingly, overheating of the PM filter 25 can be prevented, and the PM filter 25 (the base material 25a and the catalyst 25b) can be further protected.

Figure 4:
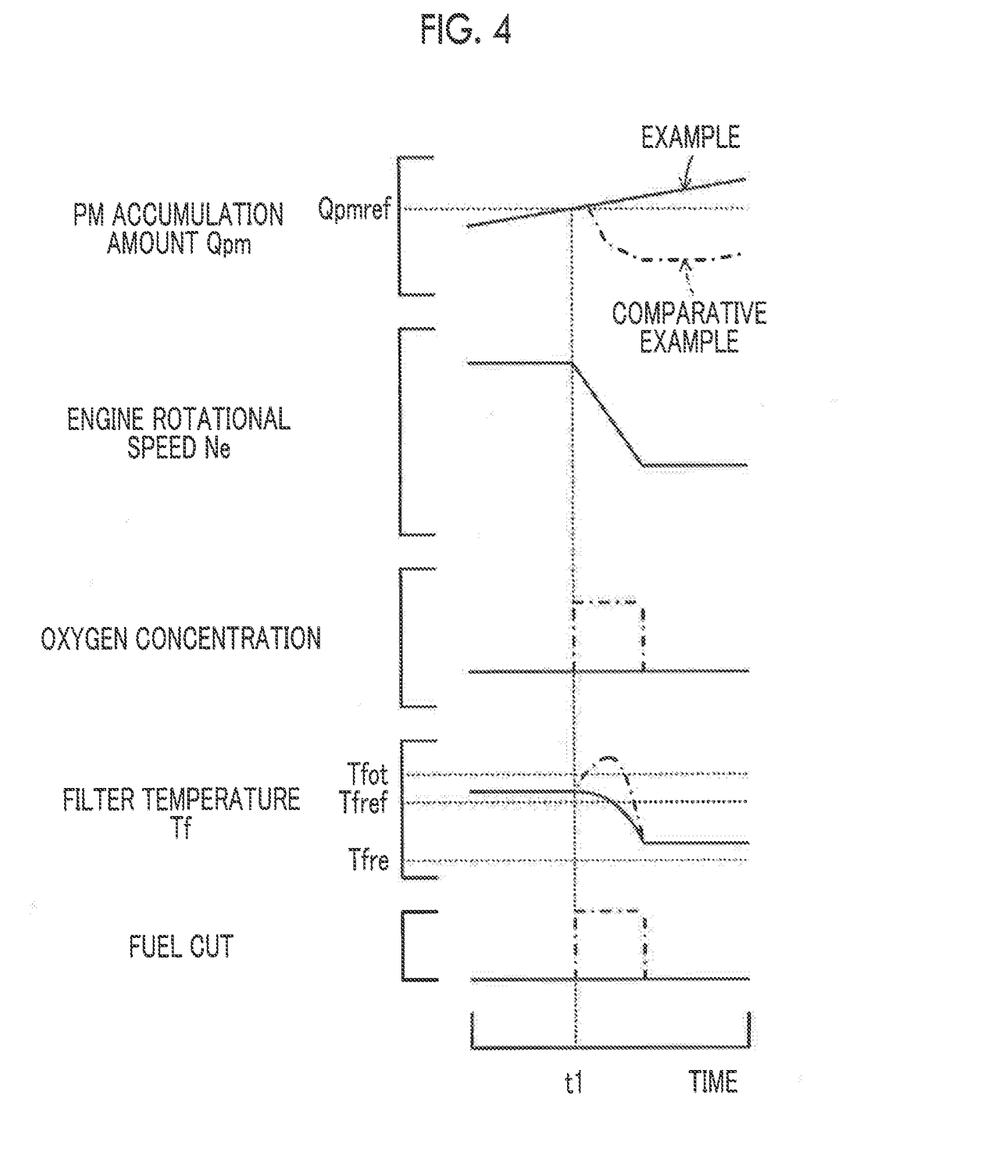
FIG. 4 is an explanatory view showing an example of changes with time in a PM accumulation amount, the rotational speed of an engine, the oxygen concentration in the exhaust system of the engine, a filter temperature, and the presence or absence of fuel cut of the engine.

FIG. 4 is an explanatory view showing an example of changes with time in the PM accumulation amount Qpm, the rotational speed Ne of the engine 22, the oxygen concentration in the exhaust system of the engine 22, the filter temperature Tf, and the presence or absence of fuel cut of the engine 22. In the figure, solid lines indicate the example and dash-dotted lines indicate a comparative example. As the comparative example, a case where when the PM accumulation amount Qpm is equal to or higher than the threshold Qpmref, when the filter temperature Tf is equal to or higher than the regenerable temperature Tfreg, fuel cut of the engine 22 is performed regardless of whether or not the filter temperature Tf is lower than the threshold Tfref, is considered. In the comparative example, as indicated by the dash-dotted lines in the figure, when PM accumulation amount Qpm becomes equal to or more than the threshold Qpmref at time t1, fuel cut of the engine 22 is performed. For this reason, the oxygen concentration in the exhaust system of the engine 22 increases and the PM accumulation amount Qpm decreases due to the combustion of the particulate matter. However, the filter temperature Tf increases to the overheat temperature Tfot or higher. On the other hand, in the example, as indicated by the solid lines in the figure, when the PM accumulation amount Qpm becomes equal to or more than the threshold Qpmref at time t1, when the filter temperature Tf is equal to or higher than the threshold Tfref, fuel cut of the engine 22 is not performed (the load operation or no-load operation is performed). Accordingly, it is possible to prevent the filter temperature Tf from reaching the overheat temperature Tfot sir higher. As a result, overheating of the PM filter 25 can be prevented, and the PM filter 25 (the base material 25a and the catalyst 25b) can be further protected.

In the hybrid vehicle 20 of the example described above, when the PM accumulation amount Qpm is equal to or more than the threshold Qpmref, when the filter temperature Tf is lower than the threshold Tfref, fuel cut of the engine 22 is permitted, and when the filter temperature Tf is equal to or higher than the threshold Tfref, fuel cut of the engine 22 is prohibited. Accordingly, in the former case, it is possible to regenerate the PM filter 25. In the latter case, overheating of the PM filter 25 can be prevented, and the PM filter 25 (the base material 25a and the catalyst 25b) can be further protected.

In the hybrid vehicle 20 of the example, when the PM accumulation amount Qpm is equal to or more than the threshold Qpmref and the filter temperature Tf is equal to or higher than the threshold Tfref, when the stored power ratio SOC of the battery 50 is equal to or lower than the threshold Sref, the load operation and the no-load operation (idle operation) of the engine 22 are permitted, and when the stored power ratio SOC of the battery 50 is higher than the threshold Sref, solely the no-load operation of the engine 22 is permitted. However, regardless of the stored power ratio SOC of the battery 50, the load operation and the no-load operation (idle operation) of the engine 22 may be permitted, or solely the no-load operation of the engine 22 may be permitted.

In the hybrid vehicle 20 of the example, the threshold Tfref is set to be lower when the PM accumulation amount Qpm is large than when the PM accumulation amount Qpm is small within a range which is lower than the overheat temperature Tfot and higher than the regenerable temperature Tfreg. However, as the threshold Tfref, a value that is uniform within a range higher than the regenerable temperature Tfreg may be used.

In the hybrid vehicle 20 of the example, the PM filter 25 is integrally formed by attaching the catalyst 25b for exhaust gas control to the base material 25a for removing particulate matter. However, the PM filter 25 may be formed so as to remove particulate matter, and separately from the PM filter 25 (on the upstream side or the downstream side of the PM filter 25 in the exhaust system of the engine 22), an exhaust gas control apparatus having the catalyst 25b for exhaust gas control may be provided.

In the hybrid vehicle 20 of the example, the battery 50 is used as the power storage device, but a capacitor may also be used.

In the hybrid vehicle 20 of the example, the engine ECU 24, the motor ECU 40, the battery ECU 52, and the HVECU 70 are provided. However, at least some of the components may be configured as a single electronic control unit.

Figure 5:
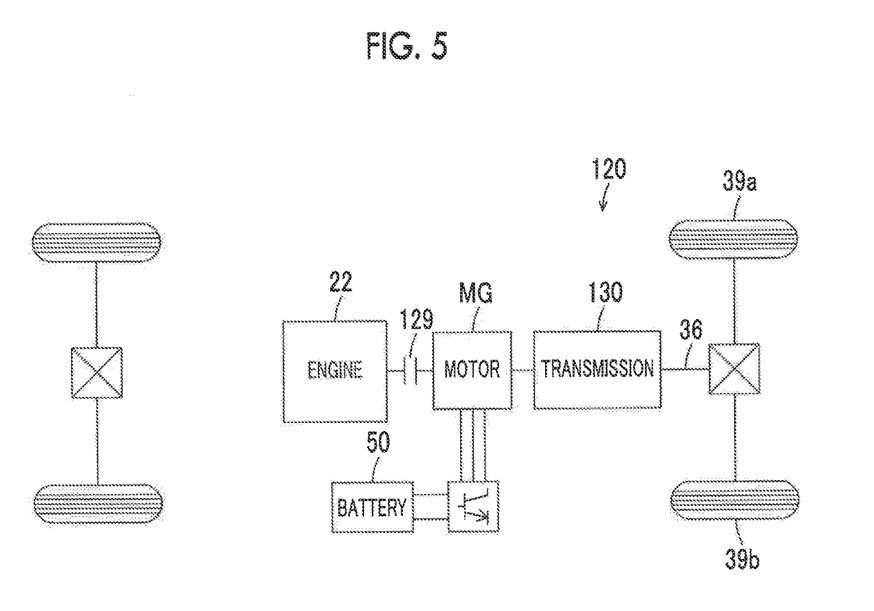
FIG. 5 is a configuration diagram schematically illustrating the configuration of a hybrid vehicle of a modification example.

In the example of the hybrid vehicle 20, the engine 22 and the motor MG 1 are connected to the driving shaft 36 connected to the driving wheels 39a, 39b via the planetary gear 30, the motor MG2 is connected to the driving shaft 36, and power is exchanged between the motors MG1, MG2 and the battery 50. However, the embodiment may also be applied to a hybrid vehicle having any configuration as long as the hybrid vehicle is provided with an engine, a motor for traveling, and a power storage device that exchanges power with the motor. For example, as illustrated in a hybrid vehicle 120 of a modification example of FIG. 5, the embodiment may also be applied to the hybrid vehicle 120 in which a motor MG is connected to a driving shaft 36 connected to driving wheels 39a, 39b via a transmission 130, an engine 22 is connected to the motor MG via a clutch 129, and power is exchanged between the motor MG and a battery 50. In addition, the embodiment may also be applied to a so-called series hybrid vehicle in which a traveling motor is connected to a driving shaft connected to driving wheels, a generator is connected to the output shaft of an engine, and power is exchanged between the generator or motor and a battery.

The correspondence between the main elements of the example and the main elements described in SUMMARY will be described. In the example, the engine 22 corresponds to "engine", the motor MG2 corresponds to "motor", the battery 50 corresponds to "power storage device", the HVECU 70, the engine ECU 24, and the motor ECU 40 correspond to "electronic control unit".

The correspondence between the main elements of the example and the main elements described in "SUMMARY" is an example for specifically describing the embodiments for carrying out the aspect described in "SUMMARY" by the example, and does not limit the elements described in "SUMMARY". That is, the interpretation of the aspect described in "SUMMARY" should be made based on the description in "SUMMARY", and the example is merely a specific example described in "SUMMARY".

Although the embodiments have been described above using the examples, the embodiments is not limited to the examples, and various modifications may be made without departing from the gist of the disclosure.

The embodiments are applicable to the manufacturing industry of hybrid vehicles and the like.

What is claimed is:

1. A hybrid vehicle comprising:
   an engine having an exhaust system in which a filter that removes particulate matter is provided;
   a motor configured to generate a driving force for the hybrid vehicle;
   a power storage device configured to exchange an electric power with the motor; and
   an electronic control unit configured to control the engine and the motor,
   wherein the electronic control unit is configured to permit fuel cut of the engine when an accumulation amount of the particulate matter of the filter is equal to or more than a predetermined accumulation amount and a temperature of the filter is lower than a predetermined temperature, and
   the electronic control unit is configured to prohibit the fuel cut of the engine when the accumulation amount of the particulate matter of the filter is equal to or more than the predetermined accumulation amount and the temperature of the filter is equal to or higher than the predetermined temperature, and thereafter, when a state of charge of the power storage device is higher than a predetermined state of charge, the electronic control unit is configured to permit a no-load operation of the engine.

2. The hybrid vehicle according to claim 1, further comprising a generator configured to generate an electric power by using power from the engine and exchange the electric power with the power storage device,
   wherein, when the accumulation amount of the particulate matter of the filter is equal to or more than the predetermined accumulation amount and the temperature of the filter is equal to or higher than the predetermined temperature, the electronic control unit is configured to permit a load operation or no-load operation of the engine when the state of charge of the power storage device is equal to or lower than the predetermined state of charge.

3. The hybrid vehicle according to claim 1, wherein the predetermined temperature is set to be lower when the accumulation amount of the particulate matter of the filter is large than when the accumulation amount of the particulate matter of the filter is small.

4. The hybrid vehicle according to claim 1, wherein the filter includes a base material which removes the particulate matter and a catalyst which cleans exhaust gas, the catalyst being formed integrally with the base material.

* * * * *